United States Patent [19]

Horvath

[11] Patent Number: 4,512,724

[45] Date of Patent: Apr. 23, 1985

[54] ELECTRIC PUMP FOR USE IN FILTERING SYSTEM OF A TROPICAL FISH TANK OR THE LIKE

[75] Inventor: Tibor Horvath, Brooklyn, N.Y.

[73] Assignee: Metaframe, Inc., Irvington, N.J.

[21] Appl. No.: 476,201

[22] Filed: Mar. 17, 1983

[51] Int. Cl.³ .................... F04B 9/00; F04B 39/06; F04B 35/04

[52] U.S. Cl. .................... 417/319; 417/360; 417/366; 417/424; 310/89; 210/169; 464/160

[58] Field of Search ............... 417/319, 360, 366, 369, 417/424; 210/169; 464/160; 310/87, 89, 172

[56] References Cited

U.S. PATENT DOCUMENTS

| Re. 24,909 | 12/1960 | Dochterman | 417/424 X |
|---|---|---|---|
| 465,869 | 12/1891 | Maclean | 464/160 |
| 2,640,338 | 6/1953 | Charvat | 464/160 X |
| 3,074,349 | 1/1963 | Zimmermann | 417/423 R |
| 3,180,267 | 4/1965 | Bemmann et al. | 417/424 X |
| 3,306,222 | 2/1967 | Simcox | 417/424 |
| 3,347,451 | 10/1967 | Vind | 417/319 X |
| 3,502,030 | 3/1970 | Bukewihge et al. | 417/423 R |
| 3,877,845 | 4/1975 | Green et al. | 417/366 X |
| 3,969,043 | 7/1976 | Bright et al. | 417/423 R X |
| 4,053,262 | 10/1977 | Horvath | 417/424 |
| 4,231,718 | 11/1980 | Ruhl et al. | 417/366 |
| 4,244,099 | 1/1981 | Haydon | 310/89 X |
| 4,247,265 | 1/1981 | Cavalcante | 417/424 |
| 4,283,645 | 8/1981 | Hofmann | 417/420 X |
| 4,404,483 | 9/1983 | Lebkuchner | 310/87 X |

FOREIGN PATENT DOCUMENTS 1297329 11/1972 United Kingdom ............... 310/89

Primary Examiner—William L. Freeh
Assistant Examiner—Paul F. Neils
Attorney, Agent, or Firm—Howard C. Miskin

[57] ABSTRACT

An electrically driven pump (10) for circulating liquid in a fish tank (16) or the like comprises a stator (32); an impeller-rotor assembly (80) comprising a shaft (82), a magnetic rotor (84) mounted on the shaft (82) for rotation in response to the electromagnetic field produced by the stator (32), and an impeller (100) rotatable with the rotor (84); and a housing (50, 60) disposed adjacent the stator (32) and defining a chamber for supporting the impeller-rotor assembly (80), the housing having inlet (44) and outlet (70) openings, one of the openings (70) being spaced from one end of the impeller-rotor assembly (80), the housing (50, 60) also defining a connecting channel (66) communicating the one opening (70) with the one end of the assembly (80) for bathing the one end of the assembly (80) in liquid.

15 Claims, 6 Drawing Figures

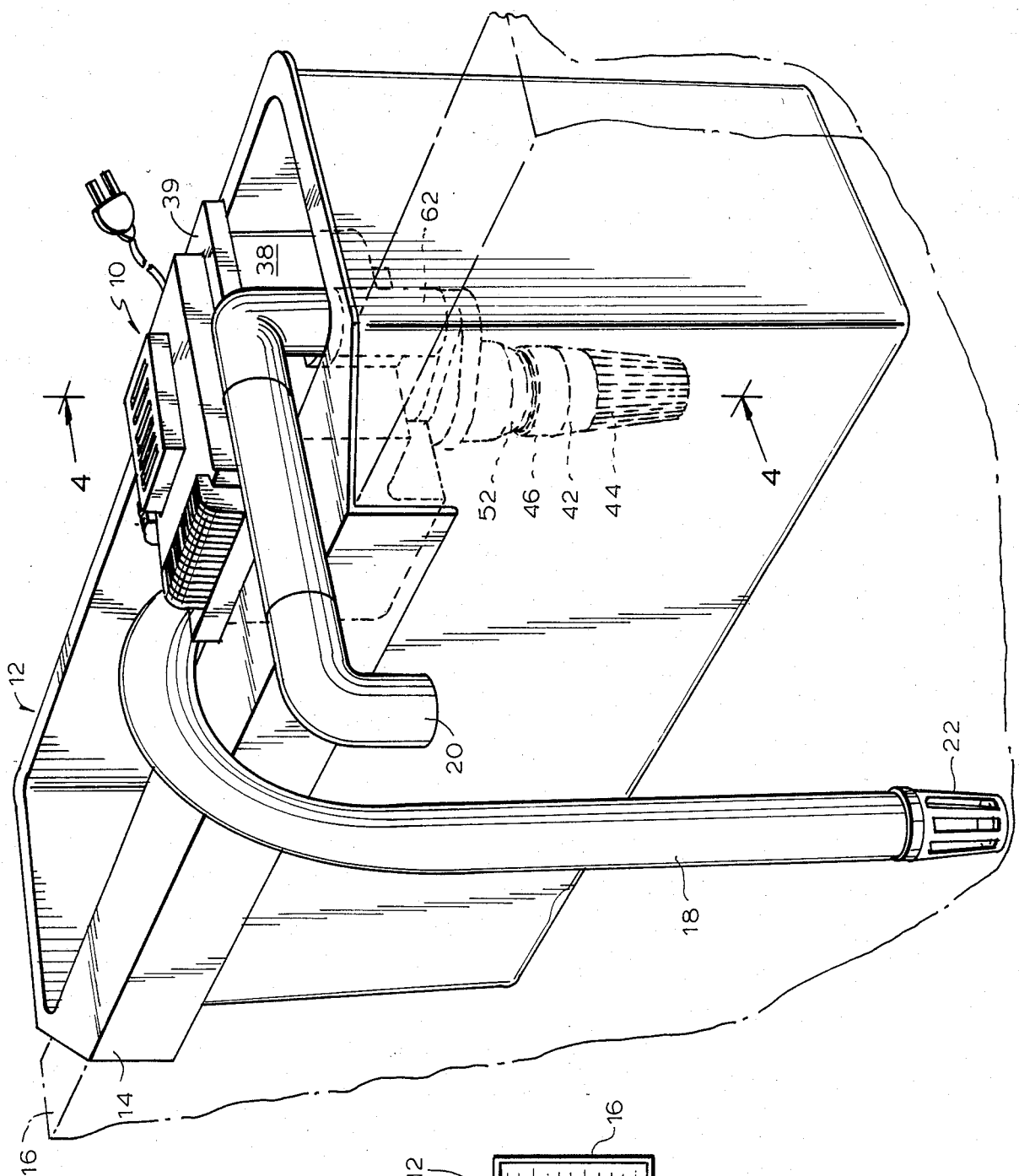
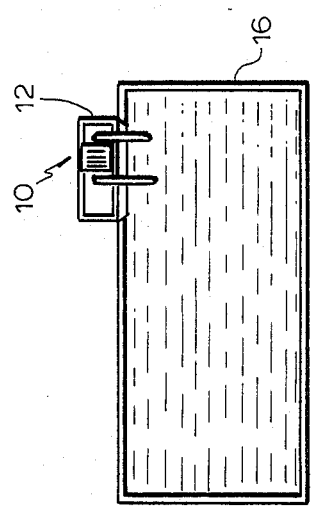
FIG.2
FIG.1

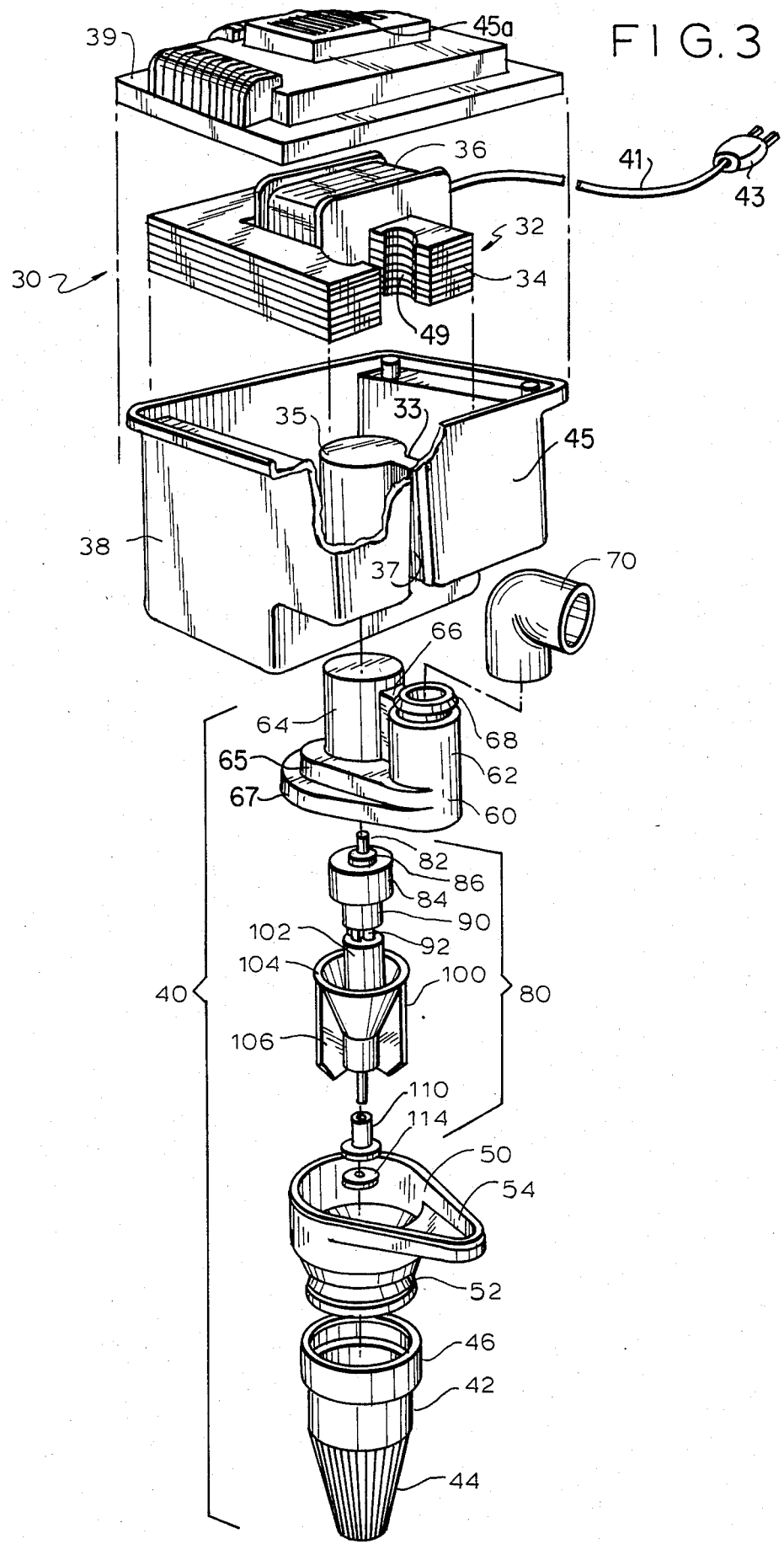

4,512,724

ELECTRIC PUMP FOR USE IN FILTERING SYSTEM OF A TROPICAL FISH TANK OR THE LIKE

BACKGROUND OF THE INVENTION

1. Technical Field

This invention relates to an electrically driven pumping unit particularly adapted for circulating and filtering water in a tropical fish tank.

2. Background Art

Electric pumps adapted for use in tropical fish tanks must operate continuously. As a result, moving parts are subjected to constant wear and tear. Consequently, any improvement in fish tank pumps which reduces the wear on moving parts, such as by cooling the moving parts or by reducing excessive vibrations, is highly desirable. Similarly, any improvement which localizes the wear to inexpensive and easily replaceable parts is also desirable. Finally, it is also desirable to accomodate replacement of the pumping components without replacing the entire electric motor assembly. This not only minimizes replacement costs when the pumping unit is worn, but also accommodates use of different capacity pumping units with the same stator assembly.

Accordingly, it is an object of the present invention to provide an electrically driven pump for circulating a liquid.

It is a further object of the present invention to provide an electrically driven pump which is particularly suitable for circulating and filtering water in a tropical fish tank or the like.

It is a further object of the present invention to provide an electrically driven pumping unit for circulating and filtering water in a tropical fish tank or the like wherein a portion of the water passing through the pumping unit bathes the moving parts to reduce wear.

It is a further object of the present invention to provide an electrically driven pumping unit for circulating and filtering water in a tropical fish tank or the like wherein the pumping unit can be easily replaced without replacing the stator assembly.

These and other objects are accomplished by means of the present invention as described hereinbelow.

DISCLOSURE OF THE INVENTION

In one embodiment, the present invention comprises an electrically driven pump for circulating liquid in a fish tank or the like comprising a stator; an impeller-rotor assembly including a shaft, a magnetic rotor mounted on the shaft for rotation in response to the electromagnetic field produced by the stator, and an impeller rotatable with the rotor; and a housing disposed adjacent the stator and defining a chamber for supporting the impeller-rotor assembly, the housing having inlet and outlet openings, one of which is spaced from one end of the impeller-rotor assembly, the housing also defining a connecting channel communicating the one opening with the one end of the assembly for bathing the one end of the assembly in liquid.

In another embodiment, the present invention comprises an electrically driven pump for circulating liquid in a fish tank or the like comprising a stator; a housing for the stator; an impeller-rotor assembly comprising a shaft, a magnetic rotor mounted on the shaft for rotation in response to the electromagnetic field produced by the stator, and an impeller rotatable with the rotor; a housing defining a chamber for supporting the impeller-rotor assembly, the impeller-rotor housing having inlet and outlet openings defining a flow path for the liquid through the chamber; and means for releasably securing the housings together with the rotor in the vicinity of the stator.

In yet another embodiment, the present invention comprises a pumping unit for circulating liquid in a fish tank or the like comprising an impeller-rotor assembly including a shaft, a magnetic rotor mounted on the shaft for rotation, and an impeller rotatable with the rotor; and a housing defining a chamber for supporting the impeller-rotor assembly, the housing having inlet and outlet openings, one of the openings being spaced from one end of the impeller-rotor assembly, the housing also defining a connecting channel communicating with the one opening and with the one end of the assembly for bathing the one end of the assembly in the liquid.

These as well as further features of the present invention will be more fully apparent from the following description and annexed drawings of the presently preferred embodiment thereof.

BRIEF DESCRIPTION OF THE DRAWINGS

In the drawings, wherein like numerals represent like parts:

FIG. 1 is a top plan view of an electrically driven pump according to the present invention mounted on a tropical fish tank;

FIG. 2 is a perspective view of the device of FIG. 1;

FIG. 3 is an exploded view of the device of FIG. 1;

BEST MODE FOR CARRYING OUT THE INVENTION

Figure 4:
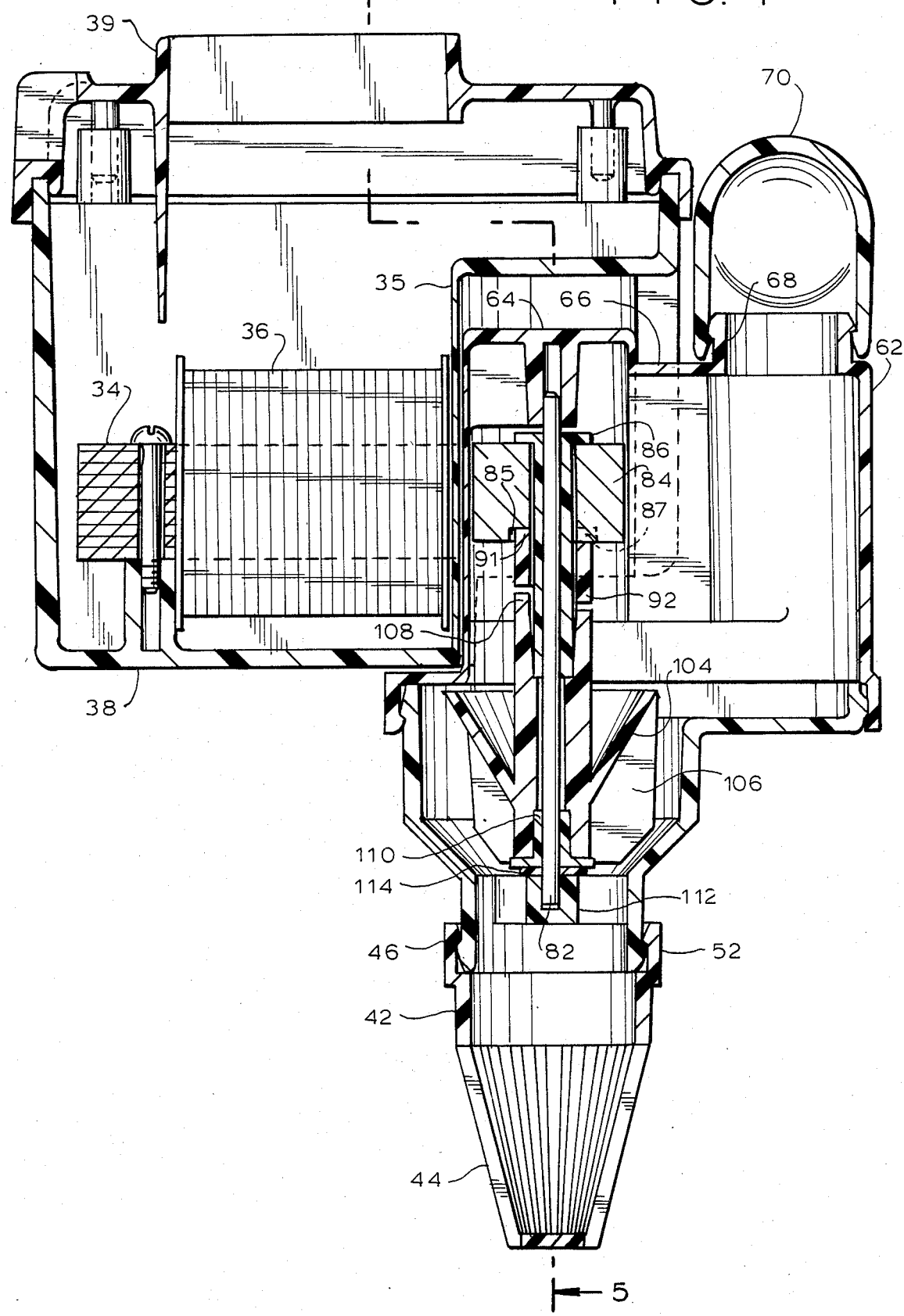
FIG. 4 is a cross-sectional view taken substantially along the line 4—4 in FIG. 2.

The drawings illustrate a preferred embodiment of the present invention. Referring initially to FIGS. 1 and 2, an electrically driven pump according to the present invention, generally designated at 10, is shown in its preferred use in a filtering system of a tropical fish tank 16. In addition to the pump 10, the filtering system includes an open-topped enclosure 12, a filter bed, and inlet and outlet tubes 18 and 20, respectively. The upper end of the enclosure 12 is provided with a depending flange 14 spaced from the main body of the enclosure on one side thereof whereby the enclosure 12 may be mounted onto a wall of a tropical fish tank 16 in a manner well known in the art. Enclosure 12 may be mounted inside or, preferably, outside the fish tank 16.

The inlet and outlet tubes 18 and 20 are provided, respectively, for drawing water into the enclosure 12 from the tank 16 and for returning water to fish tank 16 after it has been filtered. The inlet tube 18 has a strainer 22 at its inlet end which extends below the surface level of the water in fish tank 16. Strainer 22 has multiple slots sufficiently narrow to block the entry of large particles. The filter bed rests inside enclosure 12 on the bottom wall thereof. Alternately, the filter bed may be supported by an apertured filter platform on the bottom of enclosure 12. In either event, and as is well known in the art, the filter bed is made from a material adapted for filtering water in a tropical fish tank, such as charcoal dispersed in a cotton bedding. Water drawn into enclosure 12 via inlet tube 18 is filtered by this material before entering the electrically driven pump 10 for return to the tank 16 via the outlet tube 20.

Referring now to FIGS. 3, 4, 5 and 6, the pump 10 comprises two separate units: an electric drive unit 30, and a pumping unit 40. Electric drive unit 30 comprises a stator 32 supported in a preferably plastic generally box-shaped stator housing having a main body portion 38 and a cover 39, the cover being dimensioned for a snap fit on the portion 38. Slots 45a in the cover 39 accomodate air cooling of the stator 32.

Figures 5, 6:
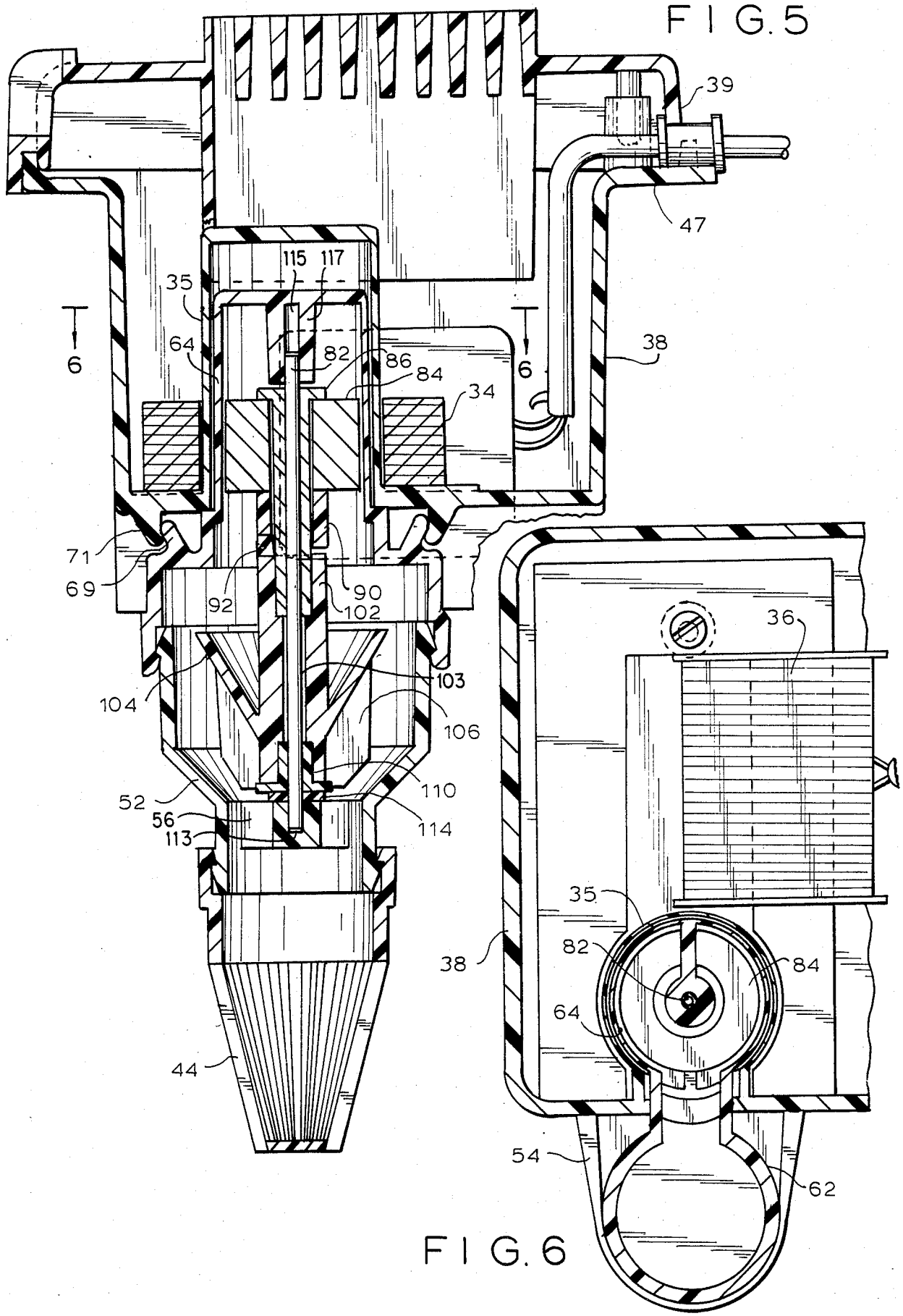
FIG. 5 is a cross-sectional view taken substantially along the line 5—5 in FIG. 4.
FIG. 6 is a cross-sectional view taken substantially along line 6—6 in FIG. 5.

For reasons that will become apparent hereinafter, the lower portion 38 of the stator housing is formed with an integral upstanding hollow boss 33 having a cylindrical section 35 and a narrowed rectangular section 37, the section 37 extending from the cylindrical section 35 to one sidewall 45 of the lower portion 38. The boss 33 terminates below the top of the lower portion 38, and a slot is provided in the sidewall 45 in communication with the rectangular section 37. As shown, the boss 33 is closed at the top and open at the bottom. As best shown in FIGS. 2 and 5, shoulders 47 are formed on opposite sides of the lower stator housing portion 38. The shoulders 47 define a dimension somewhat wider than the enclosure 12 whereby the pump 10 can be supported in the enclosure 12 by resting the shoulders 47 on opposite upper edges of the enclosure (FIG. 2).

The stator 32 comprises a coil 36 of copper windings disposed about one leg of a U-shaped lamination stack 34. The legs of the stack 34 are provided with recesses 49 to accommodate seating of the stator in the housing portion 38 with the legs of the stack about the boss 33. The coil 36 is connectable to a conventional AC outlet via a line 41 having a plug 43 at its free end.

Pumping unit 40 comprises a strainer 42, a preferably plastic impeller housing comprising lower and upper sections 50 and 60, respectively, and an impeller-rotor assembly 80. Impeller housing section 50 is hollow and comprises an enlarged portion 54 and a depending cylindrical portion 52. For reasons that will be apparent hereinafter, the housing section 50 is open ended for defining a flow path therethrough. Upper impeller housing section 60 is also hollow and comprises first and second cylindrical members 62 and 64 defining respectively, first and second cylindrical chambers, a connecting member 66 extending between the members 62 and 64 and defining a hollow duct or channel connecting the first and second cylindrical chambers, and a base 65 defining a chamber communicating with the first and second cylindrical chambers and with the connecting channel. The base 65 has a depending flange 67 dimensioned for a snap fit with the upper edge of the lower impeller housing section 50.

As shown, the upper ends of the second cylindrical member 64 and the connecting member 66 are closed whereas the upper end of the first cylindrical member 62 is open, as is the bottom of the base 65. For reasons that will be apparent hereinafter, a bushing 117 having an axially extending blind hole 115 is integrally formed on the inside of the closed top of the cylindrical member 64. Impeller housing section 60 also includes a hollow open ended elbow 70 dimensioned for frictional engagement about a recessed cylindrical portion 68 formed at the upper end of the cylindrical member 62. The other end of the elbow 70 is dimensioned for frictional engagement about a recessed cylindrical portion (not shown) formed at one end of the outlet tube 20.

Strainer 42 is similar to strainer 22 and serves a similar function. In use, its apertured lower portion 44 extends into the aforesaid filter bed and provides a coarse filtering action for water drawn into the pump 10. This prevents damage to the pumping unit 40 which could result from the entry of large particulate matter. Strainer 42 has a collar 46 dimensioned for removable frictional attachment about the neck of the portion 52 of the lower impeller housing section 50.

Impeller-rotor assembly 80 comprises an impeller shaft 82, a magnetic rotor 84, a clutch 90, and an impeller 100. Rotor 84 is annular. As best shown in FIG. 4, its inner diameter is enlarged near the bottom thereof for defining a circular recess 85. A portion 87 of the rotor extends into the recess 85 for cooperation with the clutch 90 in a manner to be explained below. The rotor 84 is mounted on the shaft 82 about a sleeve 86. In use, the rotor 84 and sleeve 86 rotate freely about the shaft 82, which remains stationary.

Impeller 100 is of a unitary construction and comprises a hub 102, a conical portion 104, and blades 106. As best shown in FIG. 4, a projection or lug 108 extends upwardly from the top of the hub 102. Impeller 100 has a central through passage 103 for mounting the impeller about the shaft 82, the impeller being freely rotatable about the shaft. The upper and lower ends of the passage 103 are enlarged. The upper enlargement receives the lower end of the sleeve 86. The lower enlargement receives a bushing 110 disposed about the shaft 82. A second bushing 112 having a blind hole 113 is secured in the center of the cylindrical portion 52 of the lower impeller housing section 50 by means of spaced radial ribs 56. As will be apparent hereinafter, the spacing between the ribs 56 accommodates the flow of water through strainer 42 to the impeller 100.

The clutch 90 is a generally annular member rotatably mounted on impeller shaft 82. Clutch 90 has an upwardly extending projection or lug 91 for engagement with the projection 87 in the rotor 84 and a downwardly extending projection or lug 92 for engagement with the lug 108 on the impeller hub 102. By means of this arrangement, and as will be described more fully below, the rotor 84 can rotate more than 360° before the clutch 90 engages rotor 84 with impeller 100. This assures that the rotor 84 builds sufficient momentum before engaging the impeller.

When the pumping unit 40 is assembled, and as best shown in FIG. 4 and 5, impeller-rotor assembly 80 sits within the chamber defined by lower and upper impeller housing sections 50 and 60, respectively, the upper end of shaft 82 being received in the blind hole 115 defined by the bushing 117 and the lower end of the shaft being received in the blind hole 113 of the bushing 112. A thrust washer 114 is disposed between the bushings 110 and 112.

When the drive unit 30 and pumping unit 40 are joined, the cylindrical member 64 and connecting member 66 are received, respectively, in the cavities defined by the sections 35 and 37 of the boss 33 in the stator housing. As shown, the base 65 of the upper impeller housing section 60 has an upstanding flange 69 dimensioned for a snap fit in a depending flange 71 formed on the bottom of the lower stator housing section 38 for releasably securing the impeller and stator housings together.

As noted above, the legs of the U-shaped stator lamination stack 34 are dimensioned to fit about the boss 33. Consequently, when the pumping unit 40 is secured to drive unit 30, the stator laminations surround rotor 84, the space between the stator and rotor being separated by the defining walls of cylindrical member 35 of boss 33 and cylindrical member 64 of the impeller housing section 60. As these walls are comprised of plastic, they do not interfere with electromagnetic field transmission from stator to rotor.

With the pump 10 supported in the enclosure 12, and with the enclosure 12 supported on the fish tank wall, the device is readied for operation by attaching outlet tube 20 to elbow 70 and disposing inlet tube 18 over the wall of the enclosure 12. The water levels in the tank 16 and enclosure 12 must be such that both ends of the intake tube 18 are submerged.

During operation, the plug 43 is plugged into an conventional AC outlet for establishing an alternating electromagnetic field at the stator 32 in a manner well known in the art. This alternating magnetic field is transmitted to the magnetic rotor 84 which begins rotation in the direction of least resistance. Those skilled in the art will recognize that the rotor must build sufficient momentum before loading. This is accomplished by clutch 90. Thus, and as best shown in FIG. 4, as rotor 84 rotates, rotor projection 87 will eventually engage lug 91 thereby rotating clutch 90. As clutch 90 rotates, depending lug 92 will eventually engage lug 108 of impeller 100. If sufficient momentum has built, impeller 100 will rotate thereby commencing the pumping operation. However, if sufficient momentum has not built, rotor 84, following its natural tendency to rotate in the direction of least resistance, will reverse direction. At that point, rotor 84 will rotate slightly less than 360° before rotor projection 87 engages the other side of clutch lug 91. The rotor and clutch will then again rotate slightly less than 360° before clutch lug 92 engages the other side of lug 108. It will be apparent, therefore, that rotor 84 will have rotated substantially more than 360° before loading by impeller 100. This insures that rotor 84 builds sufficient momentum to rotate impeller 100 to commence the pumping operation.

As impeller 100 rotates, it draws water into strainer 44, through the spaces between the ribs 56 supporting the bushing 112, and into the impeller chamber defined by the impeller housing. From there, water passes through the chamber defined by the first cylindrical member 62, and then through elbow 70 and outlet tube 20, whereupon the water flows by gravity back into the fish tank 16. The suction established by the pumping action of the device 10 continually drawing filtered water out of the enclosure 12 serves to draw water from the tank 16, through strainer 22, intake tube 18, and into the enclosure 12, thereby providing a continuous flow of water from the fish tank 16, into the enclosure 12, through the filter bed where the water is filtered, and then through the pump 10 in the manner described above for return to the fish tank 16. At start up, it may be necessary to prime the pump in a manner well known in the art.

As noted earlier, impeller shaft 82 remains stationary as rotor 84, sleeve 86, clutch 90, impeller 100 and bushing 110 rotate thereabout. Consequently, friction is established between shaft 82 and these moving parts. The moving parts in the lower portion of the impeller-rotor assembly 80 are cooled by water passing through the lower portion of the impeller chamber. The present invention also serves to cool the moving parts comprising the upper portion of the rotor-impeller assembly 80.

Thus, it will be noted that the elbow 70 extends above the cylindrical member 64. Consequently, the entire impeller section 60 will be filled with water during normal operation of the device 10. By providing a hollow connecting member 66 communicating with the chamber defined by the second cylindrical member 64, some of the water passing through first cylindrical member 62 will be diverted through the connecting member 66 and into the second cylindrical member 64. As the uppermost rotating parts of the impeller-rotor assembly 80 are housed in the cylindrical member 64, these parts are thereby bathed in water and cooled. It will thus be apparent that the structure of the device 10 provides bathing of all the rotating parts in the impeller-rotor assembly 80 thereby reducing the wear on these parts and extending their useful life.

Most of the wear and tear occurring in the rotor-impeller assembly 80 is borne by the impeller shaft 82, which functions as a bearing surface, and by the thrust washer 114. Each of these parts is easily and inexpensively replaced when they are no longer usable. Moreover, they are readily accessible by simply separating the pumping unit 40 from the drive unit 30 and thereupon separating the lower and upper impeller housing sections 50 and 60. The ability to separate pumping unit 40 from drive unit 30 also permits substitution of different pumping units 40 having different pumping capacities for use with a single drive unit 30. This permits the drive unit 30 to be retained for use with a variety of different size fish tanks.

In the preferred device 10 the impeller shaft 82, which is really a non-rotating bearing surface, is comprised of a flexible material, such as flexible plastic. The use of a flexible shaft compensates for eccentricities in magnetic rotor 84. Thus, if the rotor 84 is even slightly eccentric, the rotor will rotate off-center in a wobbly fashion. A rigid shaft would transmit the excessive vibrations to the filter housing, as well as deteriorate rapidly due to excessive wear. However, the use of a flexible shaft reduces both of these problems substantially.

While a preferred embodiment of the device in accordance with the present invention has been shown and described, those skilled in the art will appreciate that numerous changes and modifications may be made therein without departing from the spirit and scope of the invention. Accordingly, the above description should be construed as illustrative only, and not in a limiting sense, the scope of the invention being defined by the following claims:

I claim:

1. A pumping device comprising:
   a stator unit including a first housing having a side wall and a socket defining open bottom cylindrical first shell and a rotor stator located in said first housing and extending about said first shell and a connecting portion extending between said socket and said side wall;
   a rotor-impeller unit including a second housing having a plug defining bottom cylindrical second shell and a rotor-impeller assembly including an upper motor rotor registering with said second shell and exposed to the magnetic field of said stator and a pump impeller coaxial and rotatable with said rotor and disposed in said second housing below said rotor, said second housing having inlet and outlet ports in axial and peripheral communication respectively with said impeller, said first and second housing being separably coupled with said socket and plug in separable axial mutual engagement, said second housing including a chamber transversely offset from and extending to the level of said rotor and communicating with said impeller and said outlet port being formed in the upper part of said chamber and said housing including a channel extending radially from said plug shell to said chamber and being complimentary to and received by said connecting portion; and means releasably locking said first and second housings in said separably coupled condition.

2. The pumping device of claim 1 wherein said locking means are integrally formed with said first and second housings.

3. The pumping device of claim 1 wherein said rotor-impeller assembly includes a shaft supporting said rotor and impeller.

4. An electrically driven pump for circulating liquid in a fish tank or the like comprising:

a stator housing including a hollow boss having a cylindrical cavity in one wall of said housing and a hollow connecting portion extending from said cylindrical cavity to a slot formed in a side wall of said housing;

a motor stator contained in said housing and being disposed about said boss;

a rotor separably secured to said stator housing and including a first cylindrical chamber separably registering with said stator housing cylindrical cavity, a second chamber offset from said first chamber and disposed proximate said stator housing side wall and a channel extending between said first and second chambers and separably registering with said stator housing hollow connecting portion; and an impeller-rotor assembly located in said rotor housing and including a shaft, a magnetic rotor mounted on said shaft and disposed in said first cylindrical chamber and rotatable in response to the magnetic field produced by said stator and an impeller rotatable with said rotor, said second chamber having a liquid outlet opening formed therein and said rotor housing having formed within a liquid inlet opening in the vicinity of the lower end of said impeller-rotor assembly whereby water entering said inlet opening bathes said lower end of said assembly.

5. The electrically driven pump of claim 4, further comprising clutch means mounted on said shaft for engaging said impeller to said rotor.

6. The electrically driven pump of claim 5, wherein said clutch means permits said rotor to rotate more than 360° before engaging said impeller.

7. The electrically driven pump of claim 6, wherein said shaft is comprised of a flexible material.

8. A electrically driven pump for circulating liquid in a fish tank or the like, comprising:

a stator;

a housing for said stator;

an impeller-rotor assembly comprising a shaft, a magnetic rotor mounted on said shaft for rotation in response to the electromagnetic field produced by said stator, and an impeller rotatable with said rotor;

a housing defining a chamber for supporting said impeller-rotor assembly, said impeller-rotor housing having inlet and outlet openings defining a flow path for said liquid through said chamber;

said stator housing having a hollow boss defining a generally cylindrical cavity in one wall of said stator housing and a connecting portion extending from said cylindrical cavity to one sidewall of said stator housing, said one sidewall having a slot therein communicating with the cavity defined by said connecting portion;

said impeller-rotor housing including a cylindrical member defining a cylindrical chamber for the upper end of said impeller-rotor assembly and being complementary to the cylindrical cavity defined by said boss for seating therein and said impeller-rotor housing including another cylindrical member defining another cylindrical chamber, said outlet opening being formed in said other cylindrical member, said impeller-rotor housing also including a connecting member defining a connecting channel providing liquid communication between said cylindrical chamber in said impeller-rotor housing, said connecting member being dimensioned for seating in the cavity defined by said connecting portion of said boss when said stator and impeller-rotor housings are interengaged, said rotor being mounted on said shaft at the upper end of said impeller-rotor assembly and said stator including a lamination stack disposed about said boss in said stator housing; and means for releasably securing said housings together with said rotor in the vicinity of said stator when said housings are interengaged.

9. The electrically driven pump of claim 8, wherein said inlet opening is formed in said impeller-rotor housing in the vicinity of the lower end of said impeller-rotor assembly.

10. The electrically driven pump of claim 9, wherein said outlet opening is above the top of said cylindrical chamber housing said upper end of said impeller-rotor assembly.

11. The electrically driven pump of claim 10, wherein said one wall of said stator housing is the bottom wall thereof.

12. The electrically driven pump of claim 11, wherein said releasable engaging means comprises a depending flange on the bottom wall of said stator housing, and an upward extending flange on the impeller-rotor housing, one of said flanges being dimensioned for a snap fit inside the other.

13. The electrically driven pump of claim 12, wherein said impeller-rotor housing is comprised of two releasably mated parts for providing access to said impeller-rotor assembly when said parts are separated:

14. The electrically driven pump of claim 13, wherein said stator housing is formed with a pair of shoulders, one on either side thereof, said shoulders being dimensioned for resting on opposite upper edges of an enclosure for supporting said pumping unit therein.

15. The electrically driven pump of claim 14, wherein said shaft is comprised of a flexible material.

* * * * *